3,497,538
ALUMINUM GEL AND METHOD OF PREPARING SAME

Charles S. Colburn, Jr., Lookout Mountain, Tenn. assignor to Chattem Chemicals, Division of Chattem Drug & Chemical Company, Chattanooga, Tenn., a corporation of Tennessee
No Drawing. Filed Aug. 11, 1967, Ser. No. 659,879
Int. Cl. C07f 5/06; A61k 27/00
U.S. Cl. 260—448                                8 Claims

ABSTRACT OF THE DISCLOSURE

A water gellable dihydroxyaluminum aminoacetate prepared by forming a solution of aminoacetic acid and cold water, slowly adding an aluminum alcoholate to the resulting solution, cooling the solution during such addition so that the temperature of the reaction mixture is kept constantly below 60° C., and preferably below 50° C., to produce a reaction slurry and recovering the solids from the reaction slurry.

BACKGROUND OF THE INVENTION

Field of the invention

The invention relates to an improved water gellable dihydroxyaluminum aminoacetate composition produced under carefully controlled temperature conditions by the reaction of aminoacetic acid with an aluminum alcoholate such as aluminum isopropoxide. In contrast to other basic aluminum salts of amino acids, the materials of the present invention gel quite readily in water to produce a thixotropic, essentially neutral gel which can form a stable gel with water without the addition of suspending agents.

Description of the prior art

Basic aluminum salts of aliphatic amino acids have been described in Krantz and Kibler U.S. Patent No. 2,480,743. In the process described in that patent, the amino acid is first dissolved in water to produce a relatively concentrated solution. The dissolved amino acid is then reacted with an aluminum alcoholate at a temperature of about 80° C. to form an insoluble aluminum compound. The precipitated aluminum compound is separated from the liquid by filtration, and residual alcohol is removed by drying at temperatures up to about 160° C. The compounds produced according to the Krantz et al. patent, however, are not water gellable within relatively short periods of time.

U.S. Patent No. 2,588,090 to Delmar describes a process in which an aluminum gel is combined with an amino acid in the presence of water, whereby the gel liquefies and eventually forms a thin paste. This paste is then dried to obtain the product dihydroxyaluminum aminoacetate.

Rinse U.S. Patent No. 2,910,494 describes polymeric aluminum oxide salts of amino acids which involves adding the amino acid to an aluminum alcoholate in the presence of water and a lower molecular weight alcohol to provide a reaction mass, heating the reaction mass to a temperature above about 80° C. until a reaction has gone to completion, and then recovering the solids from the reaction medium.

SUMMARY OF THE INVENTION

The present invention is directed to the production of a gel forming aluminum salt which has good antacid properties and in which a stable gel can be prepared by merely adding water, without any suspending agent, to the dry powder. The gel which results has a more pleasant "feel" in the mouth than conventional tablets for many people. The gelling properties of the material greatly facilitate the preparation of stable magmas with a much higher quantity of suspended solids. The magmas have a fine texture in contrast to magmas made from conventionally produced dihydroxy aluminum aminoacetate.

In addition to their use of antacids, the compounds of the present invention find use as thickening agents. The gels produced from the compounds have swelling properties comparable to reactive aluminum hydroxide gels, and yet they can be produced from a dry powder.

DESCRIPTION OF THE PREFERRED EMBODIMENTS

In accordance with the present invention, a water gellable dihydroxyaluminum aminoacetate is produced by adding aminoacetic acid to cold water with agitation, slowly adding an aluminum alcoholate having from 2 to 5 carbon atoms in its alcoholate groups to the resulting solution, cooling the solution during such addition so that the temperature of the reaction mixture is kept constantly below 60° C., and preferably below 50° C. to thereby produce a reaction slurry, and recovering the solids from the reaction slurry. The preferred method of temperature control during the reaction is by the periodic addition of ice to the reaction mixture during the addition of the aluminum alcoholate.

The reaction proceeds in a large excess of water, there being at least about eight molecular proportions of water (original water plus ice) for every molecular proportion of the aminoacetic acid present, and preferably about ten mols or more of water per mol of the aminoacetic acid. Substantially equimolar amounts of the aminoacid and the aluminum alcoholate can also be employed although it is usually preferable to use slightly less of the aluminum alcoholate on a molar basis, than the aminoacetic acid.

The following specific examples illustrate the preparation of the improved compositions of the present invention.

Example 1

Aminoacetic acid (424.6 parts) was combined with cold water (500 parts) in a vessel equipped with an efficient agitator, a reflux condenser, and means for adding ice and aluminum isopropoxide (AIP). Upon the addition of 150 parts by weight of ice, the temperature was measured as 2° C. Then, 1100 parts of aluminum isopropoxide were added with vigorous stirring at the rate of 100 parts per minute in the early stages, and at 50 parts per minute in the latter stages. Ice was added at intervals to keep the temperature below 60° C. A typical schedule for the addition of aluminum isopropoxide and ice to the reaction solution is:

| Time (minutes) | Temp., ° C. | Total AIP in— | Cumulative total parts ice added |
|---|---|---|---|
| 0 | 2 | 0 | 150 |
| 1 | | 90 | |
| 2 | | 180 | |
| 3 | 37 | 280 | 200 |
| 6 | | 350 | |
| 7 | 46 | 450 | 300 |
| 11 | | 520 | |
| 12 | | 560 | |
| 13 | | 600 | |
| 14 | 51 | 650 | 500 |
| 19 | 36 | 650 | |
| 21 | | 700 | |
| 22 | | 730 | |
| 23 | | 770 | |
| 24 | | 810 | |
| 25 | 47 | 850 | 600 |
| 29 | | 930 | |
| 30 | 49 | 980 | 700 |
| 34 | 47 | 1,100 | |
| | | 1,100 total | 700 total |

The solids in the reaction slurry were separated from the liquid by filtration and the solids were dried at room temperature under vacuum conditions. Other means of recovery can also be used, for example, such as centrifuging and the like.

The solid particles recovered from this example were tested for gelling properties in the following way. The sample of 50 grams of the dry powder was placed in a 250 ml. beaker and 100 ml. of water were added in portions, and mixed well with a 6 inch by 5 millimeter diameter glass stirring rod. The time was noted from the start of the addition of the water until the stirring rod could be supported at a 45° angle by the mass of the gel. In the case of the product of Example 1, the gel time of the sample was fifteen minutes. The products of the present invention are characterized by gel times of one hour or less. The gel which was produced had a fine texture and was not at all gritty. The gel which formed by the addition of water was stable and the swelling properties of the gelling material were entirely comparable with that of reactive aluminum hydroxide gels.

Example II

Aminoacetic acid (424.6 parts by weight) was added to water (580 parts) in a vessel equipped with an efficient agitator, a reflux condenser, and means for introducing aluminum isopropoxide. The total of 750 parts by weight of ice was added. Then, 1100 parts of aluminum isopropoxide were added to the following schedule:

| Time (minutes): | Total AIP added |
|---|---|
| 0 | 0 |
| 1 | 80 |
| 2 | 160 |
| 3 | 240 |
| 4 | 330 |
| 6 | 490 |
| 8 | 650 |
| 10 | 800 |
| 11 | 880 |
| 13 | 1010 |
| 15 | 1100 |

Final temperature=42° C.

The solids were separated from the slurry by filtration, followed by drying. A suspension of 50 grams of the dry powder and 100 ml. of water was found to gel within 15 to 30 minutes under the test previously given.

The products produced according to the foregoing examples are well within the specifications required in N.F. XI for antacid quality dihydroxyaluminum aminoacetates. A typical analysis of the product shows that it is substantially insoluble in water, loses about 12.7% of its weight on drying, has an acid-consuming capacity of about 159.6 cc. of $1/10$ normal hydrochloric acid per gram, and an acid neutralizing capacity of 3.81.

From the foregoing, it will be understood that the improved water gellable compositions of the present invention are obtainable with a minimum of effort since they require no fine grinding or activation steps, or washing out of deleterious salts.

While the preferred method of maintaining the required reaction temperature through the addition of ice, it is also possible to achieve the required cooling through the use of other types of refrigeration systems, such as by the use of a refrigerated jacket around the reaction medium.

It should be evident that various modifications can be made to the described embodiments without departing from the scope of the present invention.

I claim as my invention:

1. The method of making a gellable dihydroxyaluminum aminoacetate which comprises adding aminoacetic acid to cold water with agitation, slowly adding an aluminum alcoholate having from 2 to 5 carbon atoms in its alcoholate groups to the resulting solution, cooling said solution during such addition so that the temperature of the reaction mixture is kept constantly below 60° C. to thereby produce a reaction slurry, and recovering the solids from the reaction slurry, the reaction medium in which said slurry is produced containing at least 8 molecular proportions of water for every molecular proportion of amino acetic acid.

2. The method of claim 1 in which said cooling is accomplished by the periodic addition of ice to the reaction mixture during the addition of said aluminum alcoholate.

3. The method of claim 1 in which said aluminum alcoholate is aluminum isopropoxide.

4. The method of claim 1 in which said temperature in the reaction mixture is held at a temperature below 50° C.

5. The method of making a gellable dihydroxyaluminum aminoacetate which comprises adding aminoacetic acid to cold water with agitation, slowly adding aluminum isopropoxide to the resulting solution, adding ice to the reaction mixture during the addition of said aluminum isopropoxide so as to keep the temperature of the reaction mixture below 50° C. to thereby produce a reaction slurry, the reaction medium in which said slurry is produced containing at least 8 molecular proportions of water for every molecular proportion of aminoacetic acid, and recovering a water gellable dihydroxyaluminum aminoacetate from the reaction slurry.

6. A water gellable dihydroxyaluminum aminoacetate produced by the method of claim 1.

7. A water gellable dihydroxyaluminum amino acetate produced by the method of claim 5.

8. A water gellable dihydroxyaluminum aminoacetate as set forth in claim 6 and having a gelling time in water not in excess of one hour.

References Cited

UNITED STATES PATENTS

| 2,480,743 | 8/1949 | Krantz et al. | 260—448 |
| 2,588,090 | 3/1952 | Delmar | 260—448 |
| 2,910,493 | 10/1959 | Rinse et al. | 260—448 |
| 2,910,494 | 10/1959 | Rinse | 260—448 |

FOREIGN PATENTS

| 1,047,911 | 11/1966 | Great Britain. |

OTHER REFERENCES

Krantz et al.: J. Pharmocology and Experimental Therapeutics, vol. 82, pp. 247–253 (1944).

TOBIAS E. LEVOW, Primary Examiner

H. M. S. SNEED, Assistant Examiner

U.S. Cl. X.R.

260—999